(12) United States Patent
Van Nimmen et al.

(10) Patent No.: US 9,270,148 B2
(45) Date of Patent: Feb. 23, 2016

(54) COIL FORM FOR MOUNTING ON A MAGNET CORE, MAGNET CORE FOR RELUCTANCE RESOLVERS, AND METHOD OF MANUFACTURE

(75) Inventors: Steven Van Nimmen, Drongen (BE); Tom Ocket, Torhout (BE); Jurgen Verstraete, Roeselare (BE); Jan Van Cauwenberge, Aalter (BE); Henk Maes, Brugge (BE)

(73) Assignee: Tyco Electronics Belgium EC BVBA, Oostkamp (BE)

( * ) Notice: Subject to any disclaimer, the term of this patent is extended or adjusted under 35 U.S.C. 154(b) by 528 days.

(21) Appl. No.: 13/522,693

(22) PCT Filed: Jan. 5, 2011

(86) PCT No.: PCT/EP2011/050109
§ 371 (c)(1),
(2), (4) Date: Jul. 17, 2012

(87) PCT Pub. No.: WO2011/086021
PCT Pub. Date: Jul. 21, 2011

(65) Prior Publication Data
US 2012/0313628 A1    Dec. 13, 2012

(30) Foreign Application Priority Data
Jan. 18, 2010 (DE) .................. 10 2010 004 887

(51) Int. Cl.
*G01B 7/30* (2006.01)
*H02K 3/52* (2006.01)
(Continued)

(52) U.S. Cl.
CPC ............... *H02K 3/522* (2013.01); *H02K 1/146* (2013.01); *H02K 24/00* (2013.01); *H02K 2203/12* (2013.01); *Y10T 29/49009* (2015.01)

(58) Field of Classification Search
CPC ......... H02K 3/522; H02K 15/02; H02K 1/16; H02K 1/2786; H02K 21/046; H02K 21/22; B62D 5/046; F16D 2121/24
See application file for complete search history.

(56) References Cited

U.S. PATENT DOCUMENTS

| 3,501,661 A | 3/1970 | Heinzen et al. |
| 5,300,884 A | 4/1994 | Maestre |

(Continued)

FOREIGN PATENT DOCUMENTS

| DE | 10143870 A1 | 4/2003 |
| DE | 102007038988 A1 | 2/2009 |

(Continued)

OTHER PUBLICATIONS

European Search Report and Written Opinion issued by the European Patent Office —Rijswijk, dated Aug. 19, 2011, for European Patent Application No. EP 2011050109; 14 pages.

(Continued)

*Primary Examiner* — Tung X Nguyen
(74) *Attorney, Agent, or Firm* — Faegre Baker Daniels LLP

(57) ABSTRACT

The present invention relates to a coil form (100) for mounting on a magnet core (118) for a rotating electrical machine or a resolver and to a corresponding magnet core. The present invention further relates to a magneto-electric angle sensor, in particular a reluctance resolver, the stator of which is constructed by the principles according to the invention. The coil form has a winding form (102) for applying a winding, the winding form (102) comprising a recess (124) for receiving a tooth (116) of the magnet core (118), at least one holding rib (114) being integrally formed and in cooperation with a holding structure (120) of the magnet core (118) fixing the coil form to the tooth. The magnet core comprises a plurality of lamellae (136) manufactured from sheet metal, which are layered on top of one another in a plane-parallel manner and interconnected, every two lamellae which lie on top of one another being rotated through an offset angle relative to one another to form the holding structure (120).

22 Claims, 16 Drawing Sheets

(51) Int. Cl.
*H02K 1/14* (2006.01)
*H02K 24/00* (2006.01)

(56) References Cited

U.S. PATENT DOCUMENTS

| | | | | |
|---|---|---|---|---|
| 8,604,660 | B2* | 12/2013 | Elser | 310/194 |
| 2004/0124733 | A1 | 7/2004 | Yamamoto et al. | |
| 2005/0194858 | A1* | 9/2005 | Ahn | 310/216 |
| 2006/0138883 | A1* | 6/2006 | Yagai et al. | 310/71 |
| 2007/0085531 | A1 | 4/2007 | Ijima | |
| 2011/0210640 | A1 | 9/2011 | Elser | |

FOREIGN PATENT DOCUMENTS

| | | |
|---|---|---|
| GB | 2240664 A | 8/1991 |
| JP | 55117449 A | 9/1980 |

OTHER PUBLICATIONS

Search Report issued by the German Patent and Trademark Office, Munich, Germany, dated Jan. 24, 2011, for German patent Application No. 10 2010 004 887.9-33; 6 pages.

International Search Report and Written Opinion issued by the European Patent Office, Rijswijk, Netherlands, dated Aug. 19, 2011, for related International Application No. PCT/EP2011/050109; 14 pages.

International Preliminary Report on Patentability issued by The International Bureau of WIPO, Geneva, Switzerland, dated Jul. 24, 2012, for related International Application No. PCT/EP2011/050109; 9 pages.

* cited by examiner

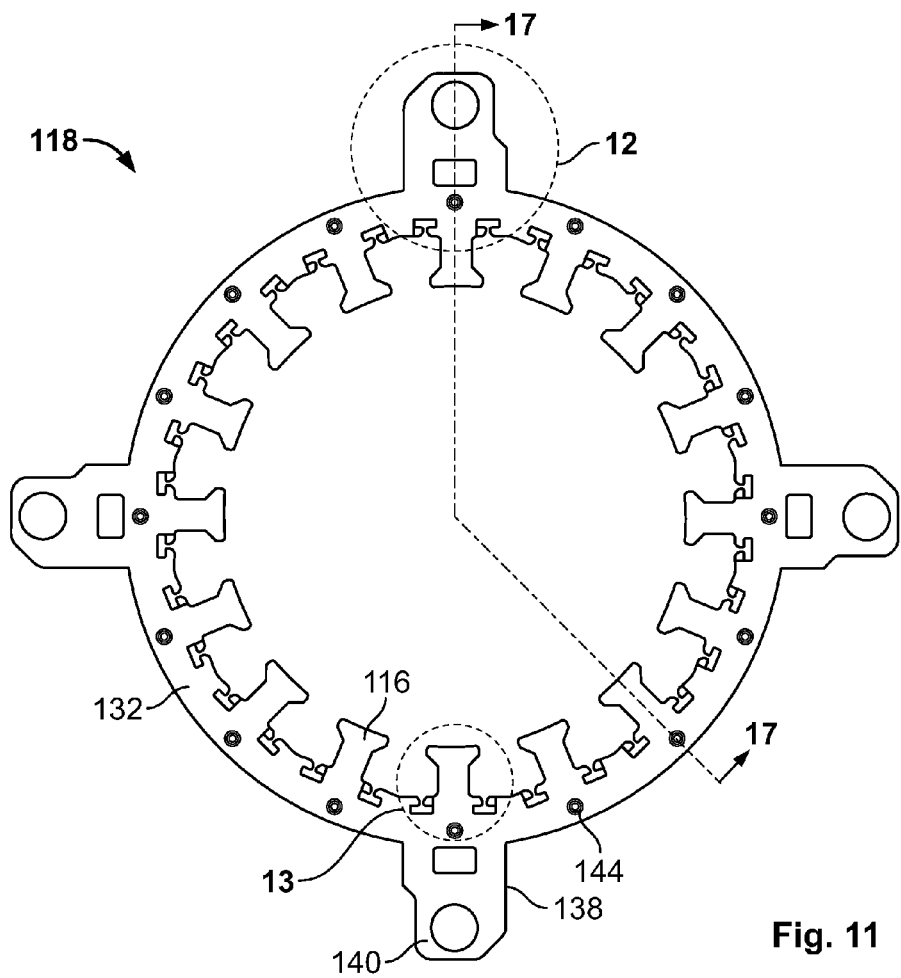
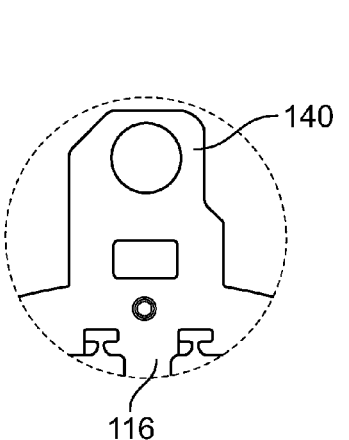
Fig. 12
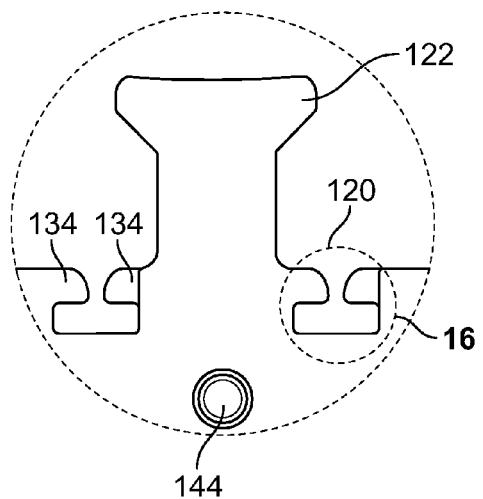
Fig. 13

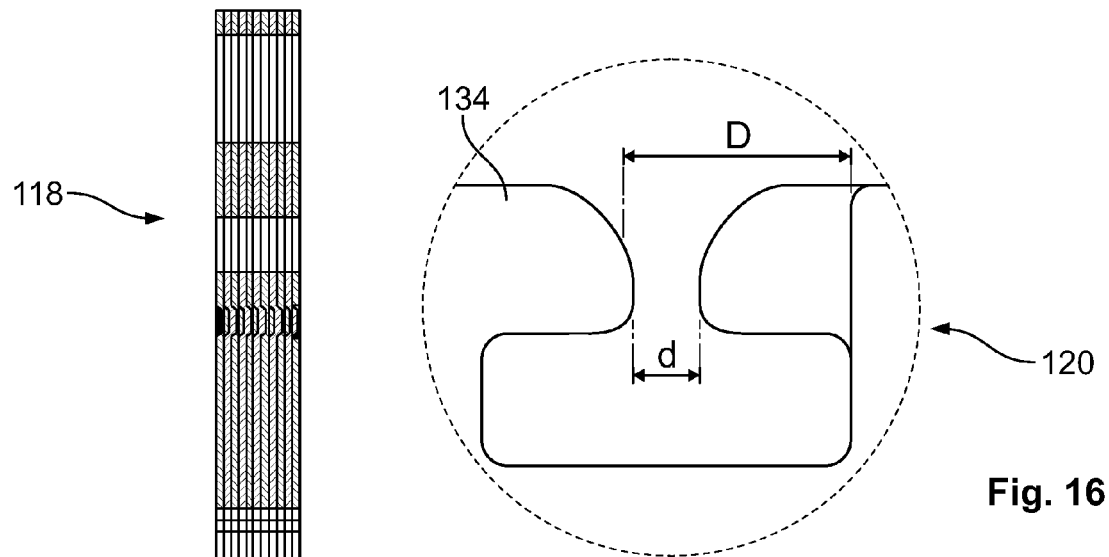
Fig. 16
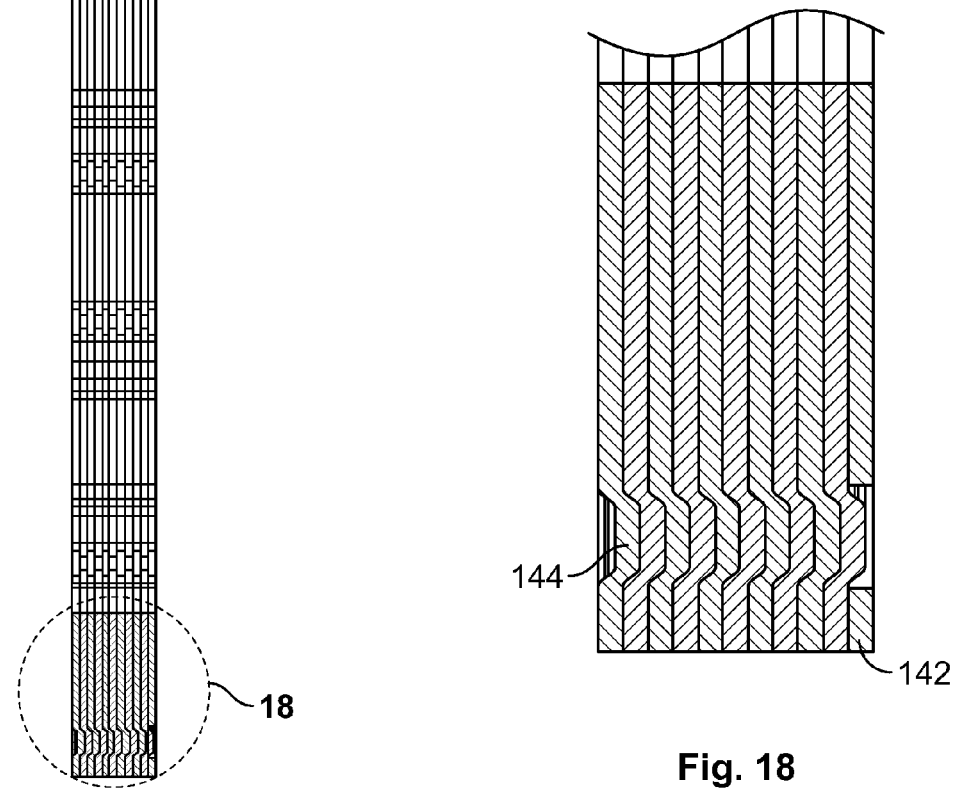
Fig. 17
Fig. 18

COIL FORM FOR MOUNTING ON A MAGNET CORE, MAGNET CORE FOR RELUCTANCE RESOLVERS, AND METHOD OF MANUFACTURE

The present invention relates to a coil form for mounting on a magnet core for example of a rotating electrical machine and to a corresponding magnet core. The present invention further relates to a magneto-electric angle sensor, in particular a reluctance resolver, the stator of which is constructed according to the principles of the invention. Finally, the present invention relates to a method of manufacture for manufacturing a reluctance resolver of this type.

Reluctance resolvers of this type have a rotationally symmetric stator, soft magnetic at least in part, and a rotationally symmetric rotor, soft magnetic at least in part, which are positioned opposite one another so as to form a gap. The magnetic resistance in the gap changes periodically based on a shape of the rotor which varies over the circumference.

The angle sensor comprises a magnetic flux transmitter, which is arranged on the stator and generates a given magnetic flux distribution in the gap by means of at least one pole pair. A magnetic flux receiver is further arranged on the stator, and measures the intensity of the magnetic field by means of at least two mutually angularly offset signal pole pairs, it being possible to deduce from the two receiver signals an angle value for a relative position of the rotor relative to the stator.

Angle sensors of this type, which are based on the principle of a variable magnetic flux intensity in the gap between the stator and the rotor, are known in various forms. These basically involve different principles for generating the magnetic flux linkage in the transmitter part and different principles for measuring the magnetic field in the receiver part. Electromagnetic coils in the form of primary and secondary windings are used for the selsyns, i.e. resolvers and synchros. Selsyns of this type in the form of resolvers and synchros have long been known as precise and robust angle sensors. In this context, so-called passive reluctance resolvers are also known, in which both the primary winding and the secondary winding are accommodated on the stator, whilst the rotor influences the magnetic flux circuit without windings, i.e. passively, merely with soft magnetic parts. An uneven shape of the soft magnetic rotor, for example achieved by providing lobes, has a different influence on the magnetic flux between the primary windings and the secondary windings, from which the angular position of the rotor can be deduced by means of the induced voltage.

There are various technical production options for manufacturing a stator of this type. On the one hand, the windings may each be wound directly onto one or more teeth of the magnet core. On the other hand, for winding schemes in which only a single tooth is surrounded by the winding or each of the windings, there is the option of initially applying the windings to plastics material coil forms and sliding these coil forms onto the teeth of the magnet core during assembly. An arrangement of this type is known from U.S. Pat. No. 5,300,884, for example. However, in this arrangement there is no mechanical fixing option by which the coil forms might be held on the magnet core.

It is therefore further known to form catch hooks 214 on the coil form, which encompass the yoke back of the magnet core 218 in the mounted state, and thus to fix the coil form 200 to the magnet core. FIG. 30 is a section through a mounted coil form 200 of this type and FIG. 31 is a perspective view of the known coil form 200 with a catch hook 214.

One problem with this known solution is that in many cases the catch hook 214 on the tooth of the magnet core 218 has so much play that the coil can move during operation, as a result of which the electric terminals 212 of the coil 200 are subjected to excessive loads in some cases, in particular in the case of vibrations. A further disadvantage of this solution is that the coil can also be moved in a rotational direction in relation to the axis of the tooth and transverse to this axis, likewise leading to loads on the electric terminals.

To avoid this rotation, it is further known to form crimped ribs 226 integrally in the extension of the catch hook, which in cooperation with the magnet core 218 lead to fixing, and thus to an interference fit, of the coil 200 on the respective tooth. However, it has been found that because of the position thereof, these crimped ribs 226 are guided over the sharp edges of the sheet metal assembly of the magnet core during mounting, resulting in a high risk of the crimped ribs simply being shorn off instead of being deformed. This leads to plastics material chips being produced, and these can lead to contamination of the arrangement.

Further, magnet cores which are produced from sheet metal lamellae layered on top of one another have higher dimensional tolerances in the direction of the layered metal sheets than transverse thereto. For example, typical tolerance values for stator assemblies of this type are ±8% or ±1 times the thickness of a single metal sheet. The crimped ribs 226 shown in FIG. 33 have to be adapted to tolerances this high, and so in the case of a particularly thin sheet metal assembly, the holding forces of the coil form on the tooth may be insufficient, whilst in the case of a particularly thick sheet metal assembly, plastics material chips are planed off.

A further disadvantage of the known catch hooks 214 is that the parts can interlock during manufacture and this shape is unfavourable for soldering processes.

There is therefore a need to fix coil forms to the teeth of a magnet core in such a way that they can be mounted easily but provide a reliable seat with long-term stability in operation.

This object is achieved by the subject-matter of the independent claims. Advantageous developments of the present invention form the subject-matter of the dependent claims.

The present invention is thus based on the idea of forming integrally on the coil form at least one holding rib, which cooperates with a holding structure of the magnet core in such a way that the coil form is fixed to the tooth.

In particular, the holding rib may be dimensioned in such a way that the coil form is fixed to the tooth in an interference fit. This solution has the advantage that a comparatively high retaining force can be achieved and reliably prevents the coil from slipping off the tooth. At the same time, twisting of the coil on the tooth and the resulting mechanical load on the electric terminals can be reliably prevented. This is particularly advantageous when the arrangement is to be used in the automotive field for example, where large vibrations and temperature differences occur.

The fixing according to the invention can be provided in a particularly simple manner if the holding rib is integrally formed on the side of the coil form facing the yoke back of the magnet core.

According to an advantageous development of the present invention, a recess for receiving the tooth of the magnet core is provided in a winding form on which the winding of the coil form is applied, and at least one crimped rib which makes an additional interference fit possible between the tooth and the coil form is integrally formed on a wall of the recess. This additionally increases the reliability of the fixing.

To prevent these crimped ribs from being shorn off by the lamella assembly of the magnet core, according to the invention the crimped ribs are arranged in a corner region of the coil form and the crimped ribs are further slanted in two directions. This means that the crimped ribs are capable of centring the coil form relative to the tooth of the magnet core. Since these crimped ribs cooperate with the side of the magnet core extending towards the plane-parallel layer of the lamellae of the magnet core, in this case the dimensions no longer change over time and the fixing remains reliable over the entire life of the arrangement.

Finally, the coil form according to the invention may comprise a recess which is configured in such a way that the cross-section thereof tapers in steps or is bevelled in a funnel shape. In this way, an interference fit can be provided on an end region of the tooth of the magnet core in the fully mounted state.

According to the invention, modifications are also made to the magnet core and lead to improved and simplified mounting of the coil form. On the one hand, holding structures are provided on the magnet core and cooperate with the holding ribs on the coil form. For example, this holding structure can be formed by two hook-shaped projections which engage in the holding rib.

Since the distance between the mutually opposed holding projections must be relatively small, in such a way that the plastics material holding rib can be reliably engaged, a comparatively expensive punching tool must be provided if the two projections are to be provided in each individual sheet metal lamella.

By contrast, according to the invention it is provided that each individual lamella is configured in such a way that the projections are oriented in one direction in a first and a third quadrant and in the opposite direction in a second and fourth quadrant. By laminating the metal sheets with a radial angular offset of 90° between every two sheets lying on top of one another, a compact holding structure can be mechanically produced without having to maintain these low structural widths when punching an individual lamella sheet. To make simple automation of the layering process possible, the individual lamellae configured according to the invention can always be radially offset in the same direction, i.e. clockwise or anticlockwise, from one layer to the next.

Naturally, with a correspondingly altered layout of the individual metal sheet, other offset angles can also be implemented.

Further, the individual teeth of the magnet core can each be provided with pole shoes. These pole shoes, which may be formed by end regions of the tooth distributed in a corresponding formation, have two different important purposes in the arrangement according to the invention.

On the one hand, the magnetic flux which flows directly from pole to pole without being guided by the rotor can be reduced by a formation of this type. In particular in an application in resolvers, any part of the magnetic flux that does not pass through the gap leads to a reduction in signal strength and thus in the accuracy of the resolver. In motors or generators, it is important for reasons of torque and efficiency that the magnetic flux takes the path through the gap and across the rotor.

On the other hand, a configuration of this type comprising a pole shoe can also be used mechanically to fasten the coil form. For this, it is advantageous for the cross-section of the inner wall of the coil form to taper in such a way that the coil form is only pressed into contact with the pole shoe of the magnet core when in the fully mounted position. Further, to reduce the forces occurring during mounting, only a small proportion of the surface of the recess of the coil form should come into contact with the pole shoe of the magnet core. For this purpose, further crimped ribs may be provided on the inner wall of the coil form.

For an improved understanding thereof, the present invention is explained in greater detail by way of the embodiments shown in the appended figures, in which like components are provided with like reference numerals and like component names. Further, individual features or feature combinations from the embodiments shown and described may represent independently inventive solutions per se or solutions according to the invention.

In the drawings:

FIG. 11 is a plan view of a magnet core according to the present invention;

FIG. 12 is a first detail of the magnet core of FIG. 11;

FIG. 13 is a second detail of the magnet core of FIG. 11;

FIG. 16 is a detail of FIG. 13;

FIG. 17 is a sectional view of the magnet core according to FIG. 11;

FIG. 18 is a detail from FIG. 17;

In the following, advantageous embodiments of the present invention are described in greater detail with reference to the figures. In this connection, it should be noted that although a magnet core which can be used as a stator in a reluctance resolver is always assumed in the following, the present invention may naturally be applied to any type of rotating electrical machine. This means that the type of fixing according to the invention of coil forms can also be used for motors and generators, both on stator cores and on rotor cores.

Further, the present invention is not restricted to embodiments in which the teeth of the magnet core project inwards towards the central axis from an annular yoke back; magnet core teeth arranged on the outer circumference of a core can also be correspondingly equipped with the coil forms according to the invention in an equivalent, analogous manner.

Finally, the coil forms according to the invention can be combined not only with laminated magnet cores, but also with magnet cores which are manufactured in a single piece.

Figure 1:
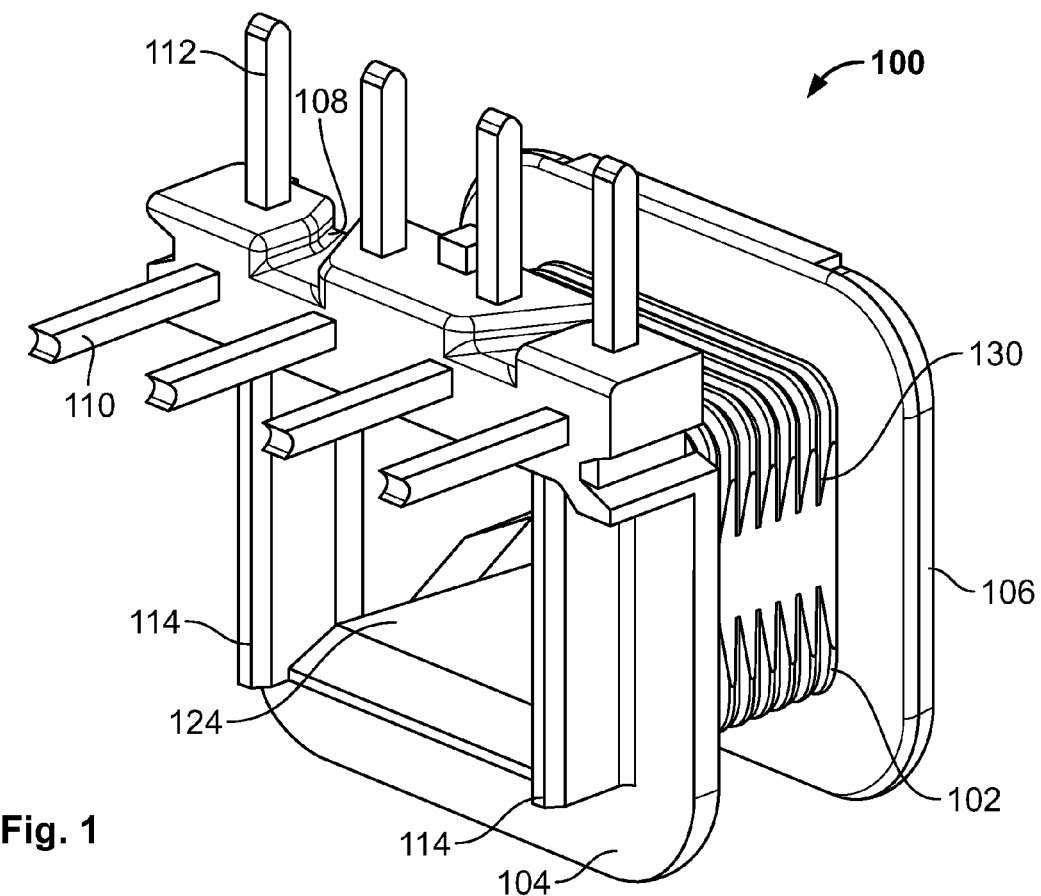
FIG. 1 is a perspective view of a coil form according to the invention without a winding.

FIG. 1 is a perspective view of a coil form 100 according to the invention. The coil form comprises a winding form 102 on which a winding can be arranged. The coil form 100 further has a first flange 104 and a second flange 106 for guiding the winding. The terminals of the winding can be guided via feed channels 108 and fixed to winding-wire terminals 110, which may for example be formed as so-called wire-wrap terminals (also known as wire wrapping terminals). The winding-wire terminals 110 are conductively connected to contact pins 112, which can be interconnected via a solder connection to a corresponding circuit board in accordance with the desired wiring pattern, as proposed for example in German patent application DE 10 2009 021 444.5. A knurl 130 assists in the application of the wire winding.

According to the invention, two holding ribs 114 are integrally formed on the coil form 100. As can be seen upon viewing together with the sectional view of FIG. 2, each of these holding ribs 114 is formed in such a way as to be pressed in between two projections 134 of a holding structure 120 when fully mounted on the tooth 116 of a magnet core 118. Further, at least one holding rib which locks to the magnet core may be provided.

Figure 2:
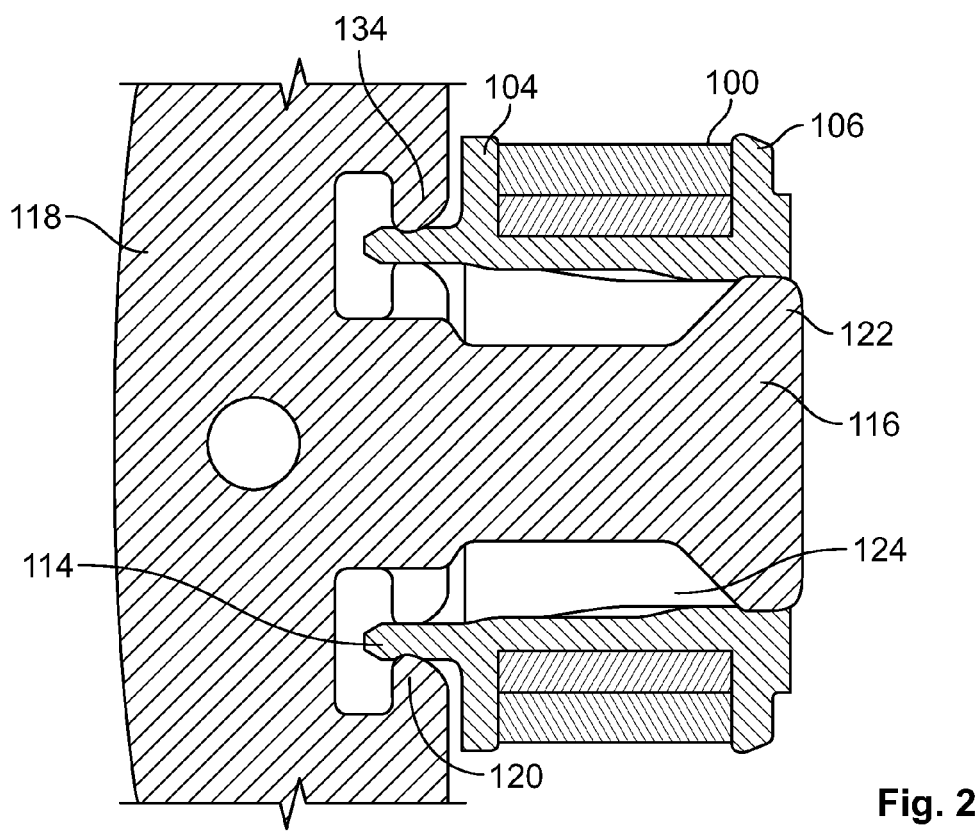
FIG. 2 is a section through the coil form according to the invention when fully mounted on a magnet core.
Figure 5:
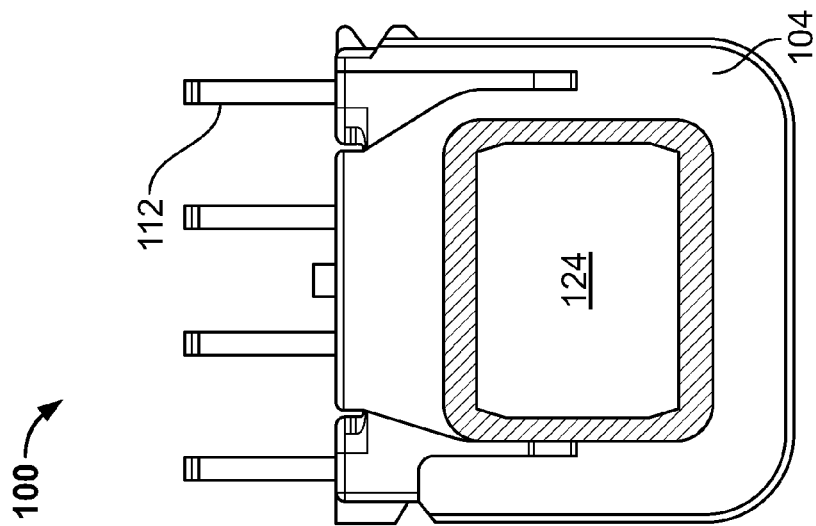
FIG. 5 is a sectional view of the coil form of FIG. 1.

As is shown in FIG. 2, the tooth 116, which is conventionally referred to as a pole, has a widened head region 122, which acts as a pole shoe and further cooperates with a recess 124 of the coil form to make an interference fit of the coil form 100 on the tooth 116 possible. Thus, the coil form is mechanically fixed to the magnet core 118 by an interference fit both on the side associated with the first flange 104 and on the opposite side.

At the same time, the coil form 100 does not have any unnecessarily protruding parts which might impede mounting and assembly.

Further details of the coil form according to the invention will be explained in greater detail with reference to FIG. 3 to 10.

Crimped ribs 126 are provided on the inner wall of the recess 124, in such a way that the friction between the pole shoe 122 of the tooth 116 and the recess 124 does not become excessively high in the final mounted state. These crimped ribs 126 have bevels 128, which make optimised guidance and centring of the coil form 100 possible during mounting.

Figure 4:
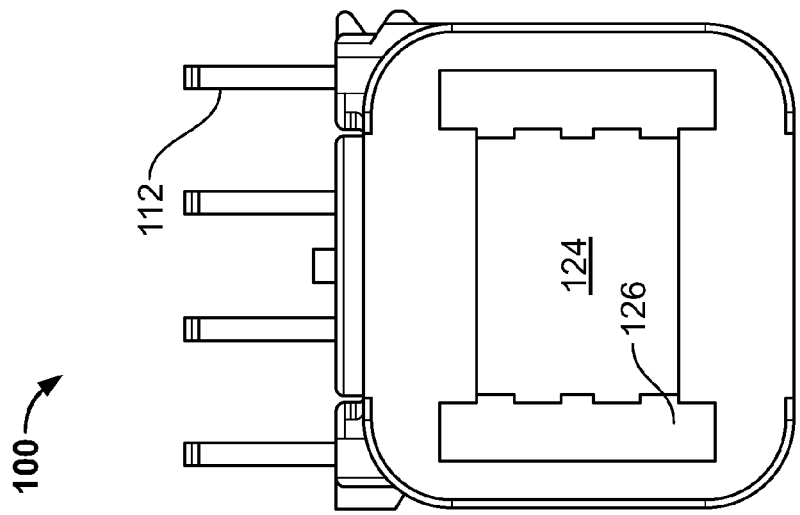
FIG. 4 is a first plan view of the coil form of FIG. 1.
Figure 3:
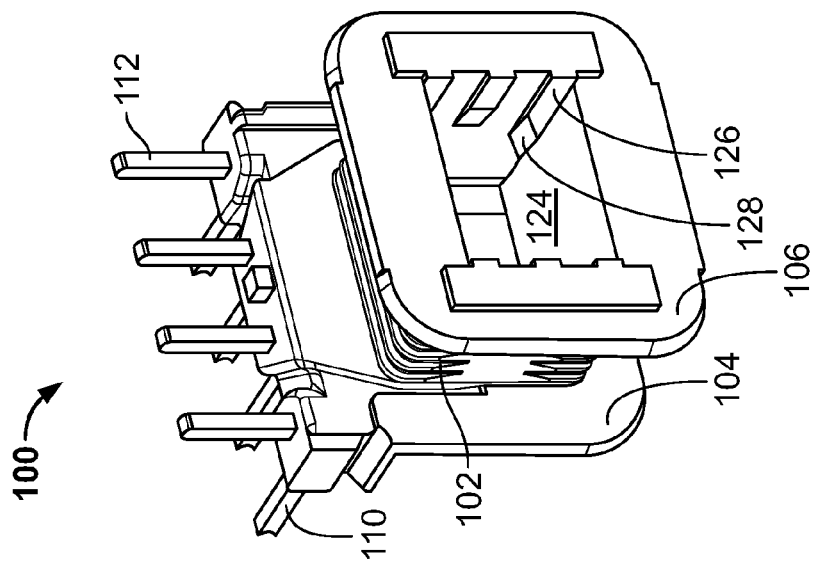
FIG. 3 is a view rotated through 180° of the coil form from FIG. 1.
Figure 6:
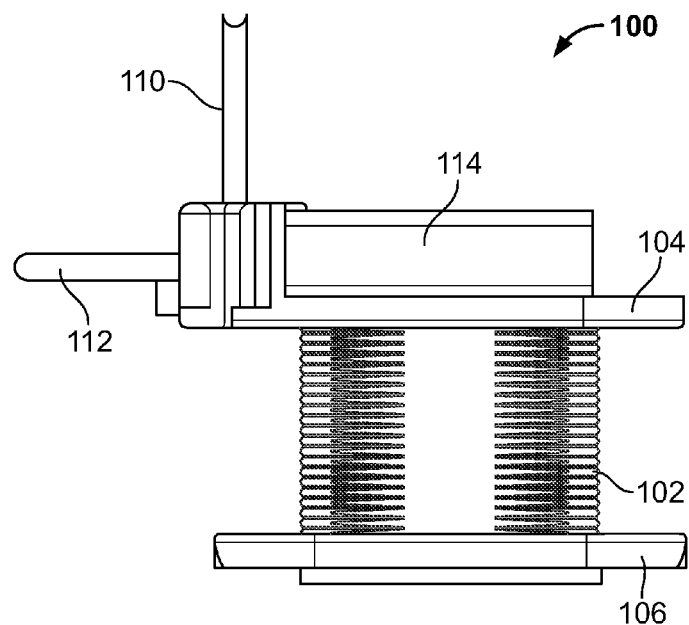
FIG. 6 is a first side view of the coil form of FIG. 1.
Figure 7:
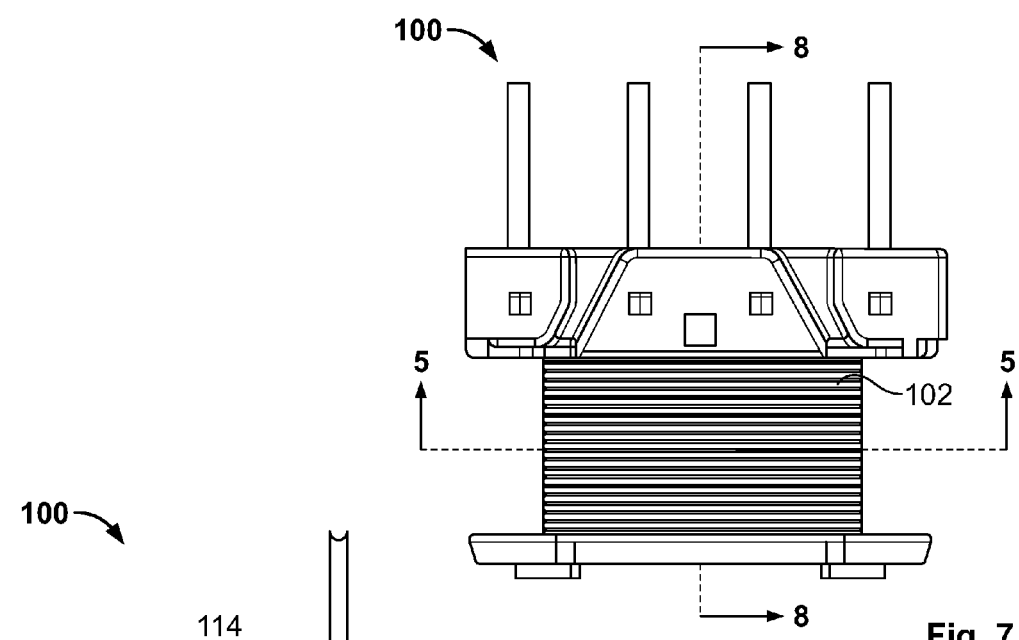
FIG. 7 is a second side view of the coil form.
Figure 8:
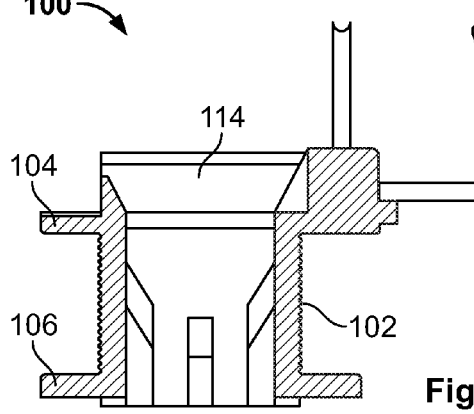
FIG. 8 is a section through the coil form of FIG. 7.
Figure 9:
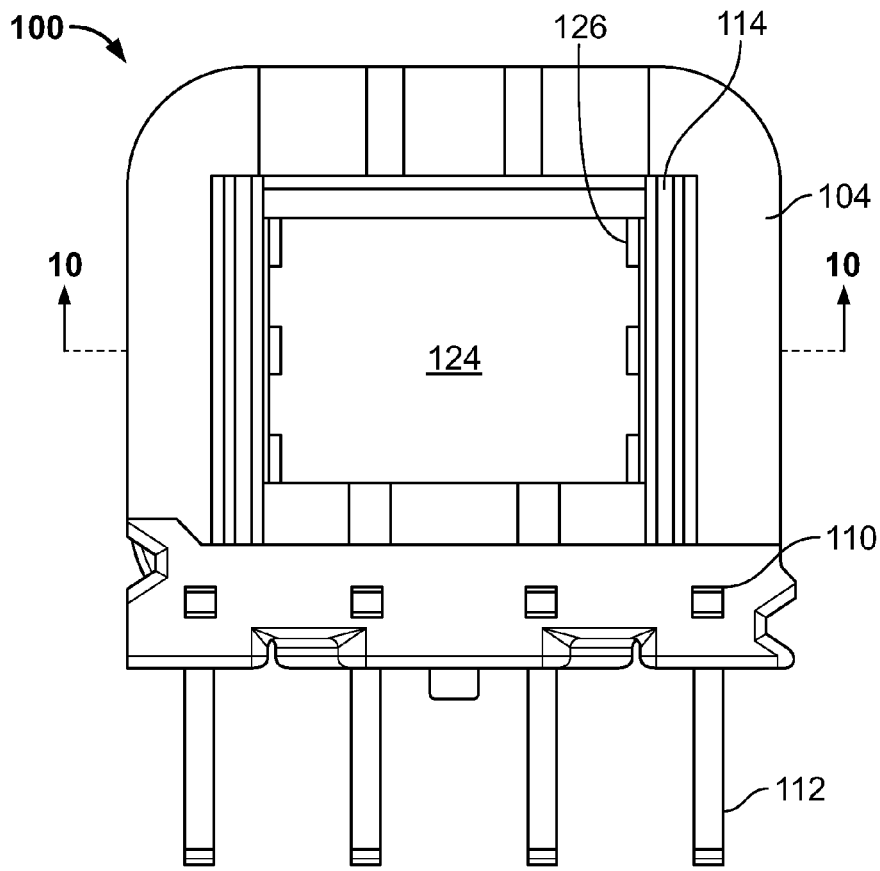
FIG. 9 is a further plan view of the coil form of FIG. 1.
Figure 10:
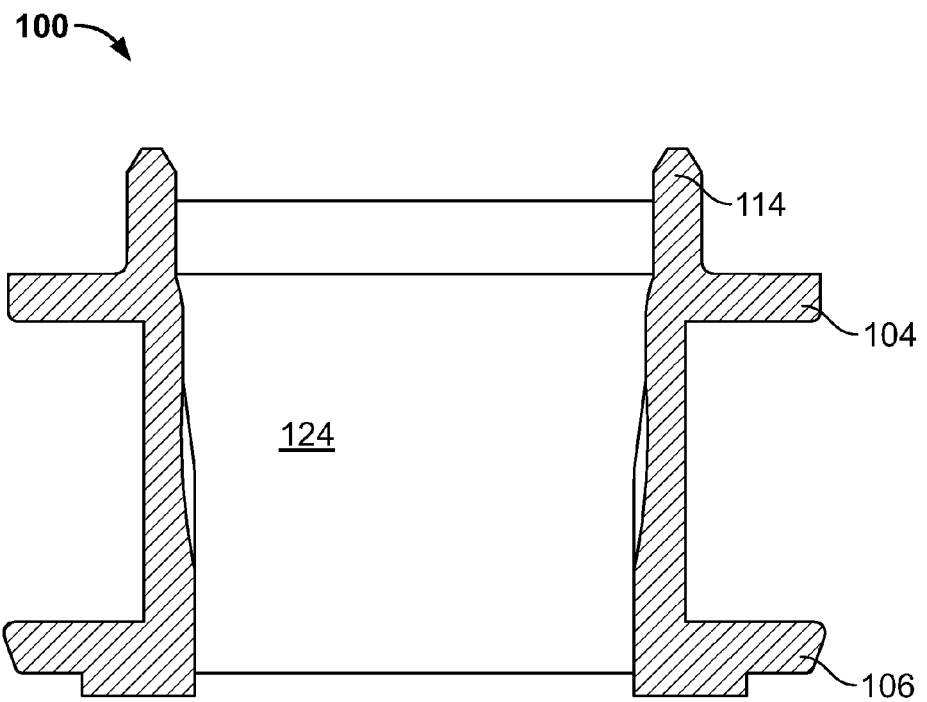
FIG. 10 is a section through the coil form of FIG. 9.

A further advantage of this arrangement is that the crimped ribs 126, as can be seen from FIG. 4, only come into contact with the magnet core 118 at the side face, which is defined by the layered metal sheets and the tolerance of which is determined purely by the punching tool. In this way, the seat can be prevented from deteriorating once it is established if the thickness of the layered magnet core assembly decreases over the life thereof.

Further, the recess 124 is stepped in such a way that the region of the second flange 106 associated with the gap and provided with the crimped ribs 126 has the smallest cross-section and can be fixed to the pole shoe of the tooth 116 in an interference fit.

The winding-wire terminals 110 may be manufactured together with the respective contact pin 112 as a single-piece angled member and be integrally cast into the coil form 100. The winding form 102 of the coil form 100 comprises a knurl 130 for guiding and holding the winding.

In the following, the configuration according to the invention of the magnet core 118 will be discussed in greater detail with reference to FIG. 11 to 21.

In the embodiment shown, the magnet core 118 comprises a total of sixteen teeth 116, as is proposed for example for the configuration of 16-pole stators for a 6-speed resolver according to DE 10 2009 021 444.5. The individual teeth 116 are interconnected via a yoke back 132. In the transition region between the yoke back 132 and the tooth 116, a pair of holding projections 134 is integrally formed on each of the two sides of the tooth 116. These holding projections, shown for example in a perspective view in FIG. 14, engage in the holding ribs 114 in such a way that the coil form 100 is fixed rigidly to the tooth 116.

Since the necessary distance d between the two holding projections 134 has to be relatively small for reliable engagement with the holding rib, a relatively precisely machined and expensive punching tool would have to be used to create this low structure width if both holding projections 134 were provided on every metal sheet of the lamella stack which forms the magnet core. However, according to the invention each individual sheet is only equipped with one holding projection 134 per holding structure 120. This increases the minimal structural width of the opening to be punched to D, as is shown in FIG. 16.

Figure 14:
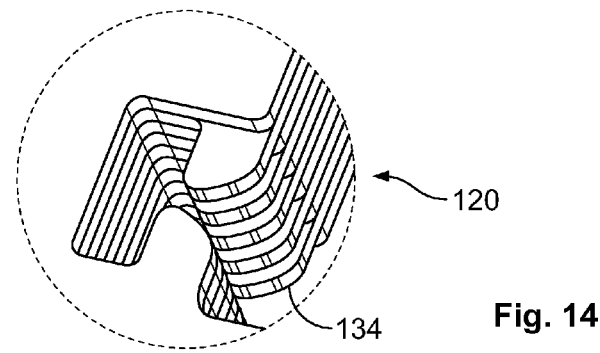
FIG. 14 is a perspective view of the holding structure of the magnet core of FIG. 11.
Figure 15:
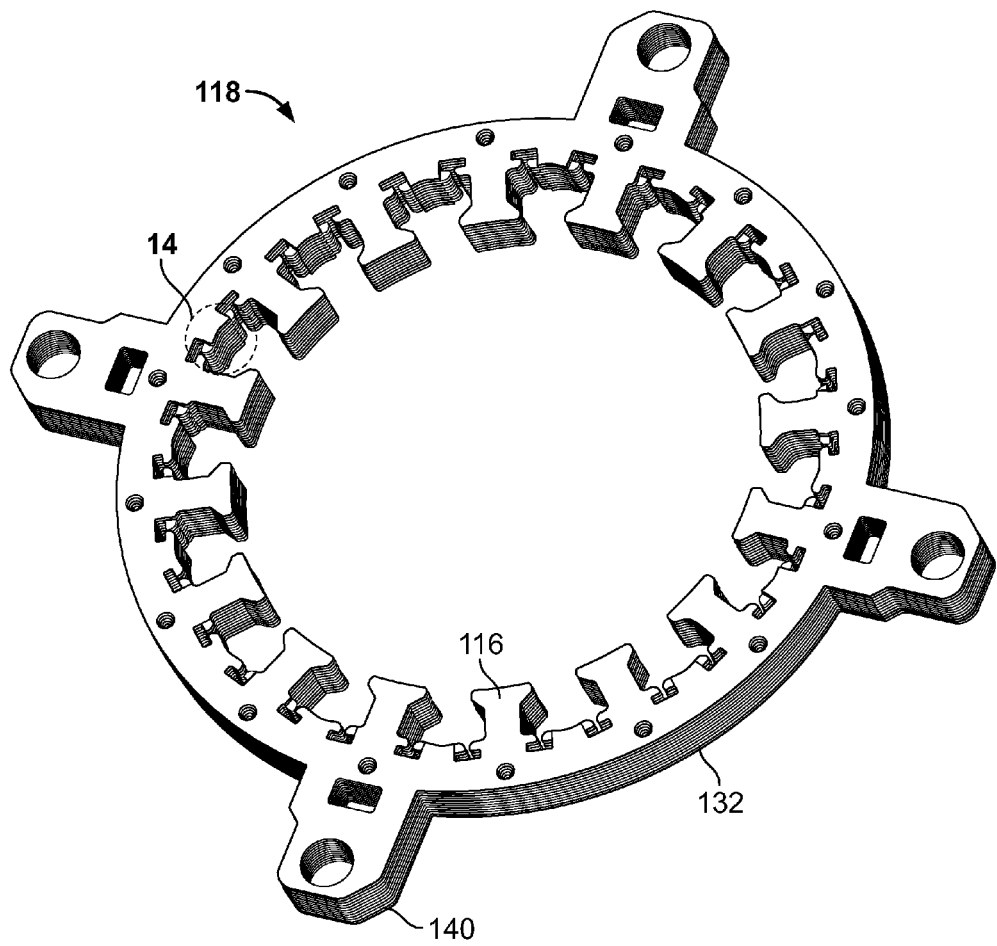
FIG. 15 is a perspective view of the magnet core.
Figure 19:
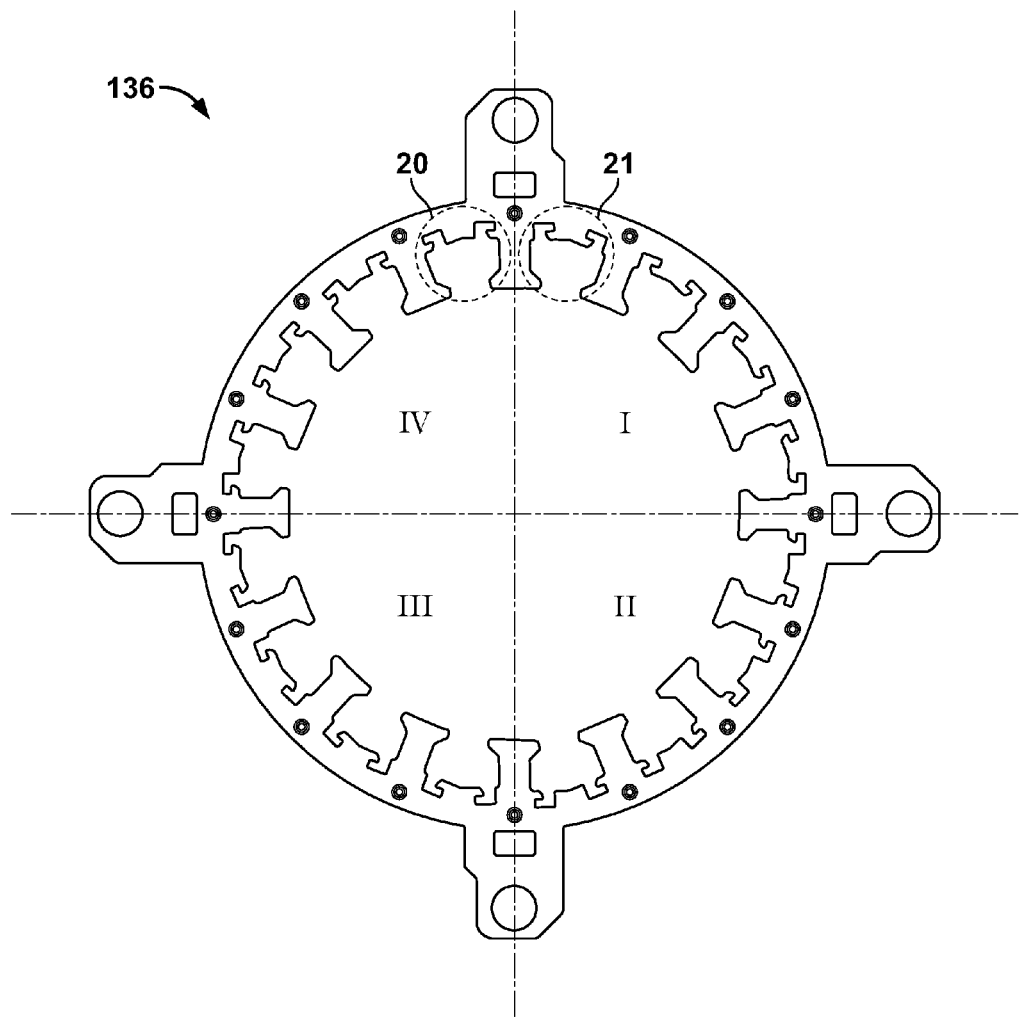
FIG. 19 is a plan view of an individual sheet metal lamella according to the present invention.
Figure 20:
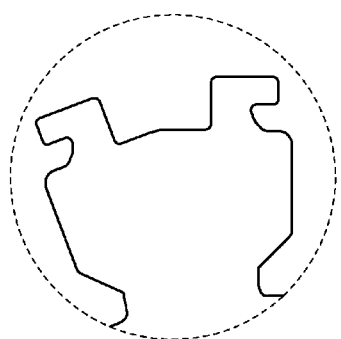
FIG. 20 is a first detail from the sheet metal lamella of FIG. 19.
Figure 21:
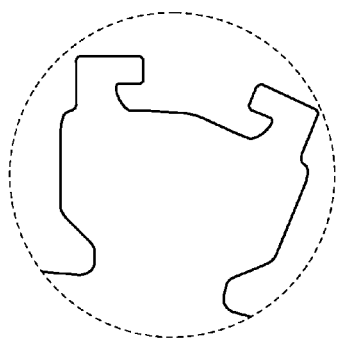
FIG. 21 is a second detail from the sheet metal lamella of FIG. 19.

According to the invention, the projections 134 are oriented in one direction in a first quadrant I and a third quadrant III, whilst they are oriented in the opposite direction in a second and fourth quadrant (II, IV), as is shown in FIG. 19. In this way, when the magnet core is constructed from the lamellae 136 shown in FIG. 19, two successive lamellae need only each be layered rotated through 90° relative to one another to achieve the holding structure on both sides as shown in FIG. 14. This may for example take place continuously in a uniform direction of rotation so as to facilitate automation of the stacking process.

The lamellae 136 further comprise indentations 144, which fit inside one another as positioning means so as to secure the assembly against unintentional displacement, as is shown in FIG. 18. The first lamella 142 comprises an opening at this point in such a way that the outer contour of the lamella assembly is smooth.

Four mounting projections 140 are used for screwing and fixing the magnet core in the final mounted state to a motor housing for example.

Figure 22:
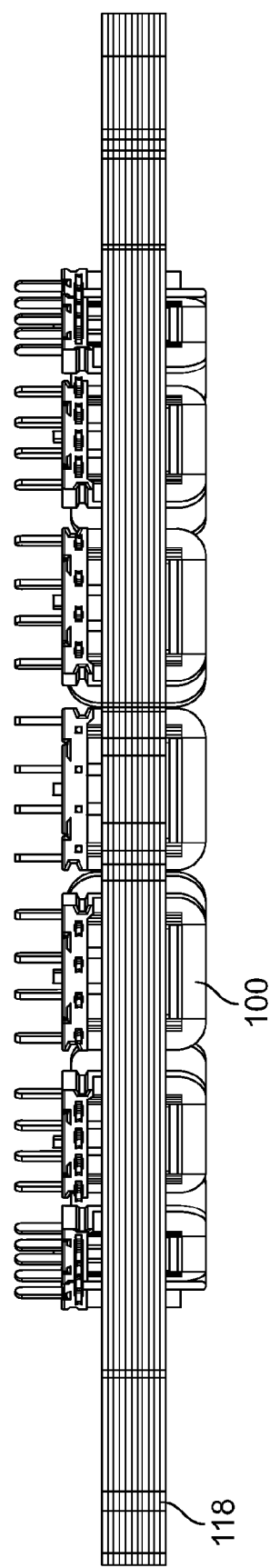
FIG. 22 is a side view of a magnet core equipped with wound coil forms.
Figure 23:
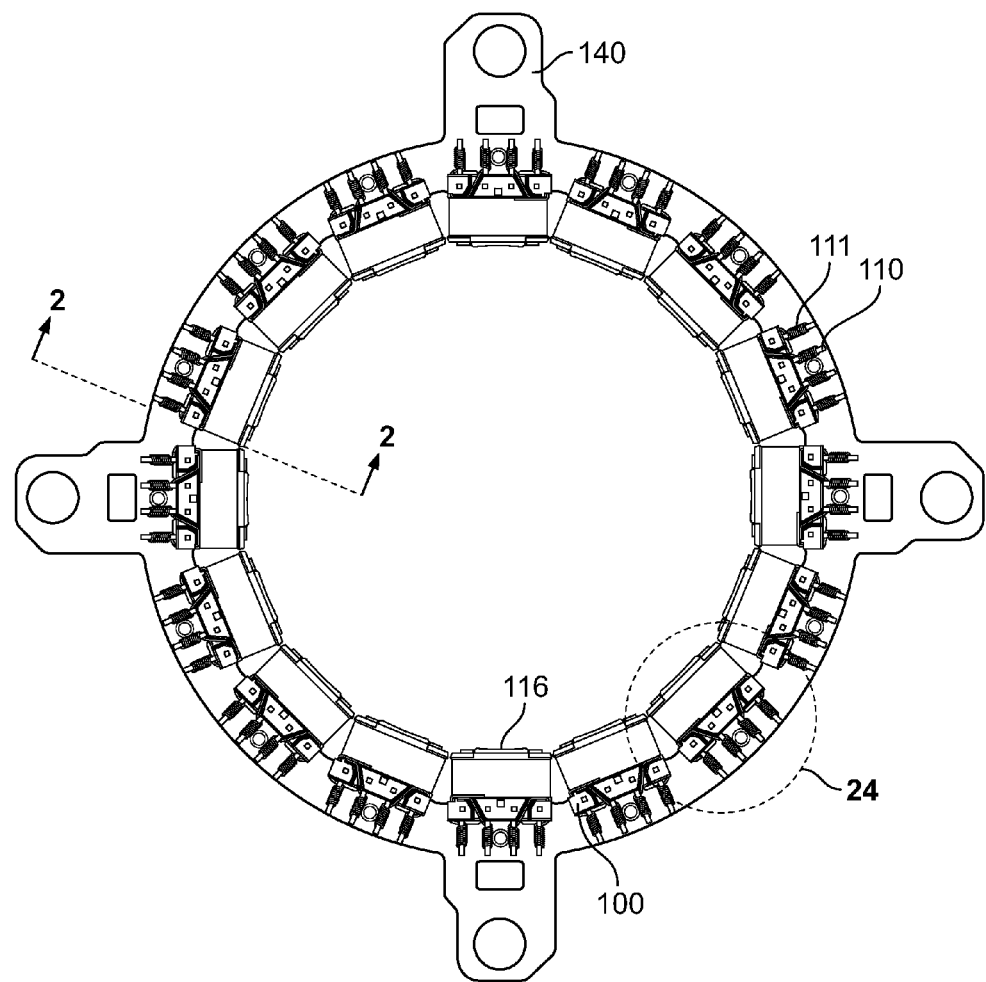
FIG. 23 is a plan view of the arrangement of FIG. 22.
Figure 24:
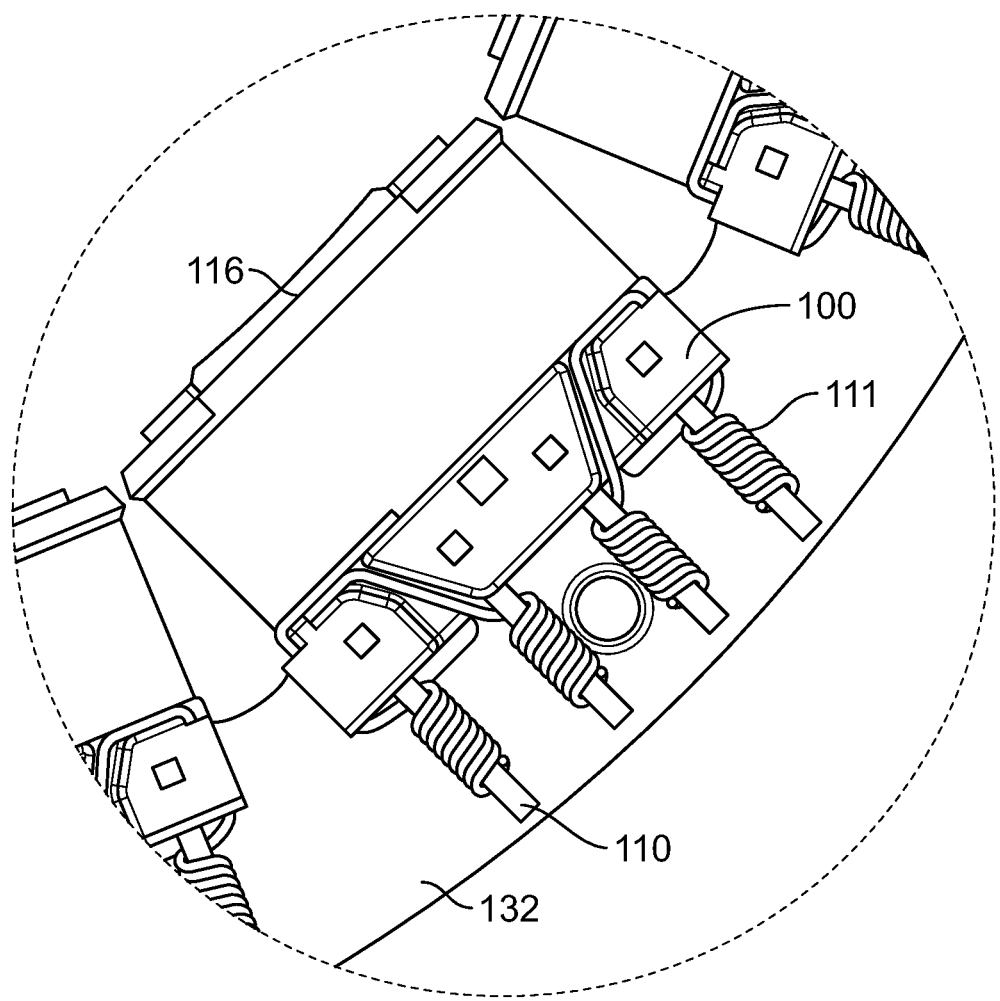
FIG. 24 is a detail from FIG. 23.
Figure 25:
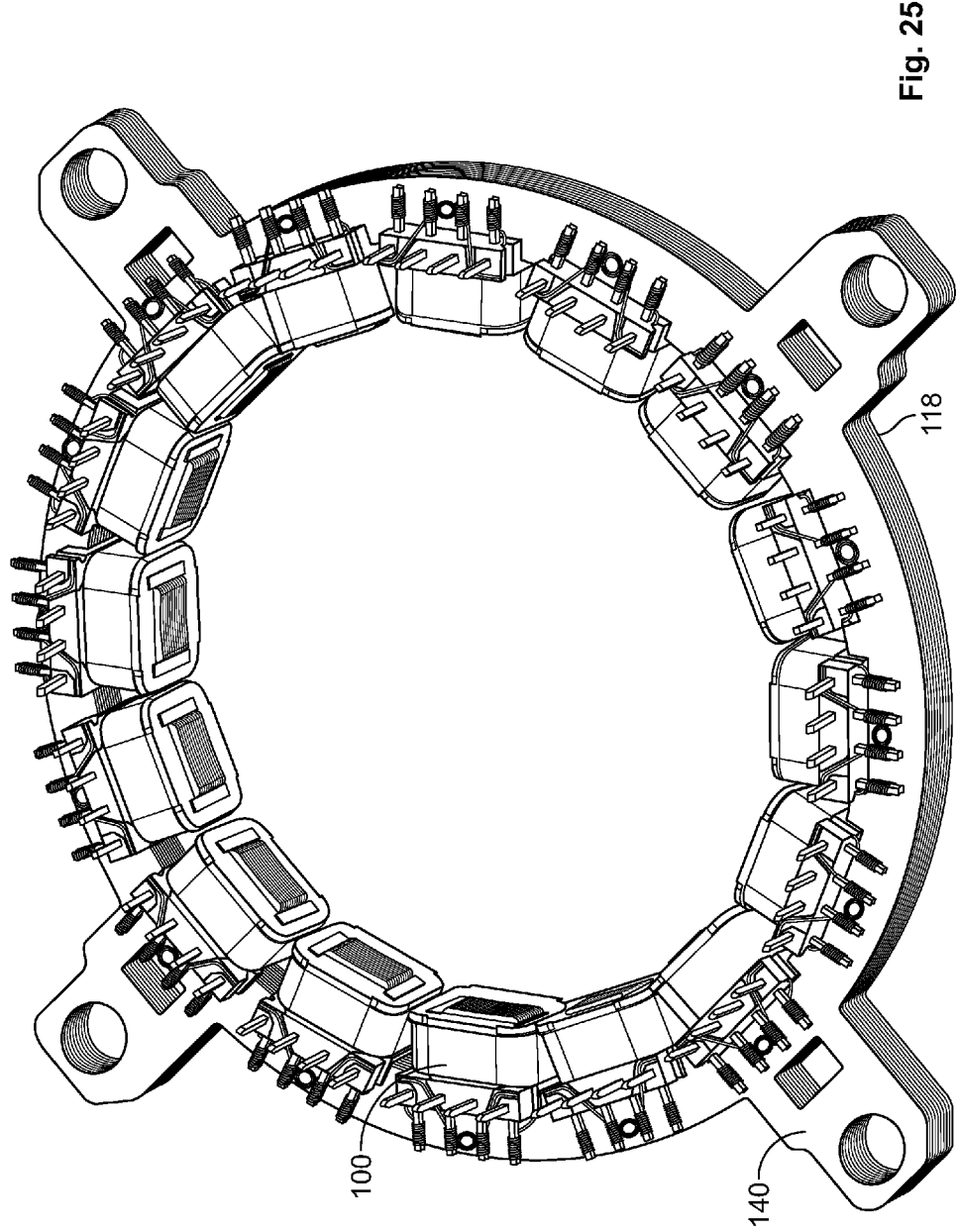
FIG. 25 is a perspective view of the equipped magnet core of FIG. 22.

FIGS. 22 and 25 show how the fully wound coils are arranged on the magnet core.

Figure 26:
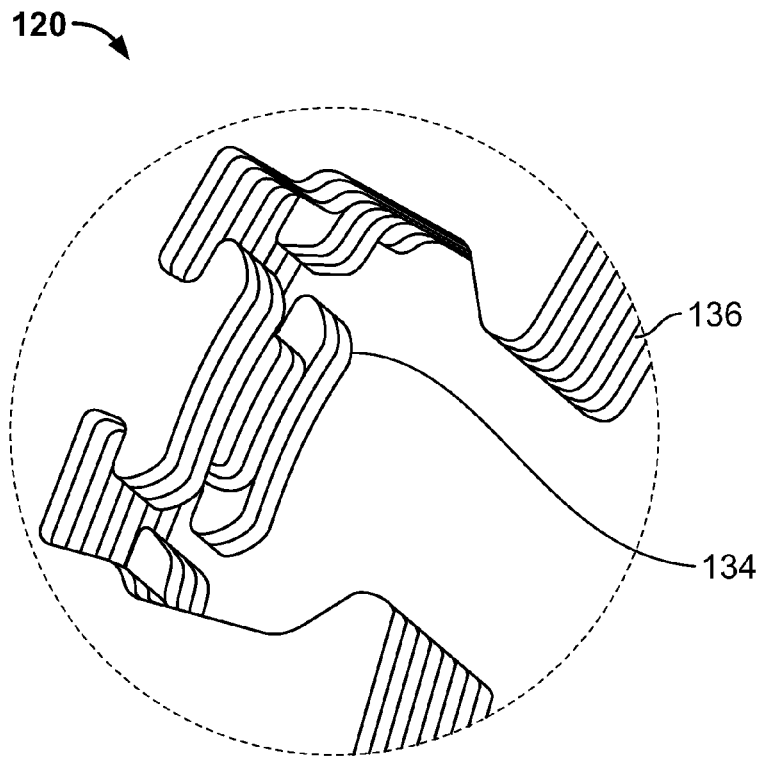
FIG. 26 is a detail from a magnet core according to a second embodiment.
Figure 27:
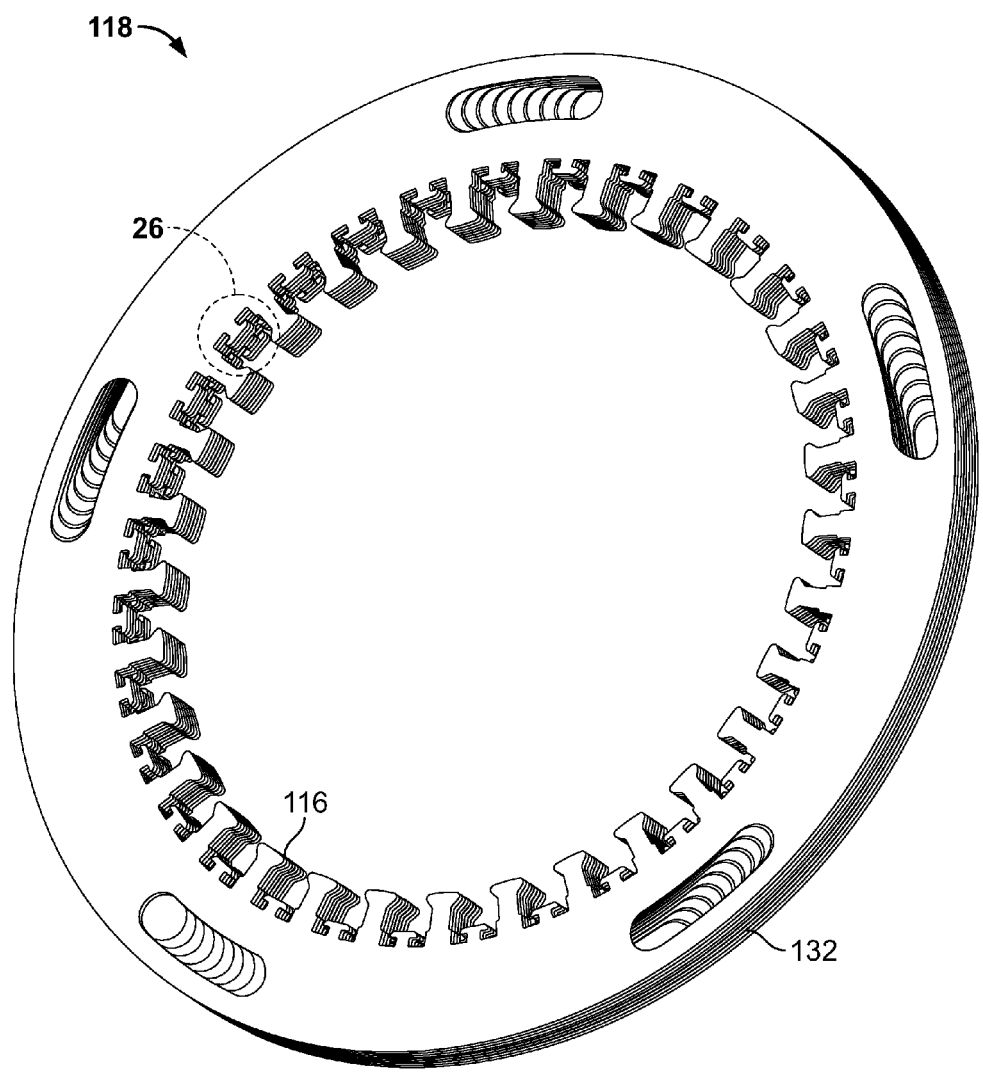
FIG. 27 is a perspective view of the magnet core according to the second embodiment.

The principles according to the invention may naturally also be applied to modified magnet core structures. As can be seen for example from FIGS. 26 and 27, a 32-pole stator 118 can also be configured in such a way that holding projections 134 for fixing the coils are arranged between the teeth 116. As can be seen for example from the detailed view of FIG. 26, in this case the lamellae of the individual metal sheets need not necessarily be arranged offset from sheet to sheet, as is shown in the first embodiment of FIG. 14, but may also be constructed offset in relatively small assemblies, which lie congruently on top of one another.

Figure 28:
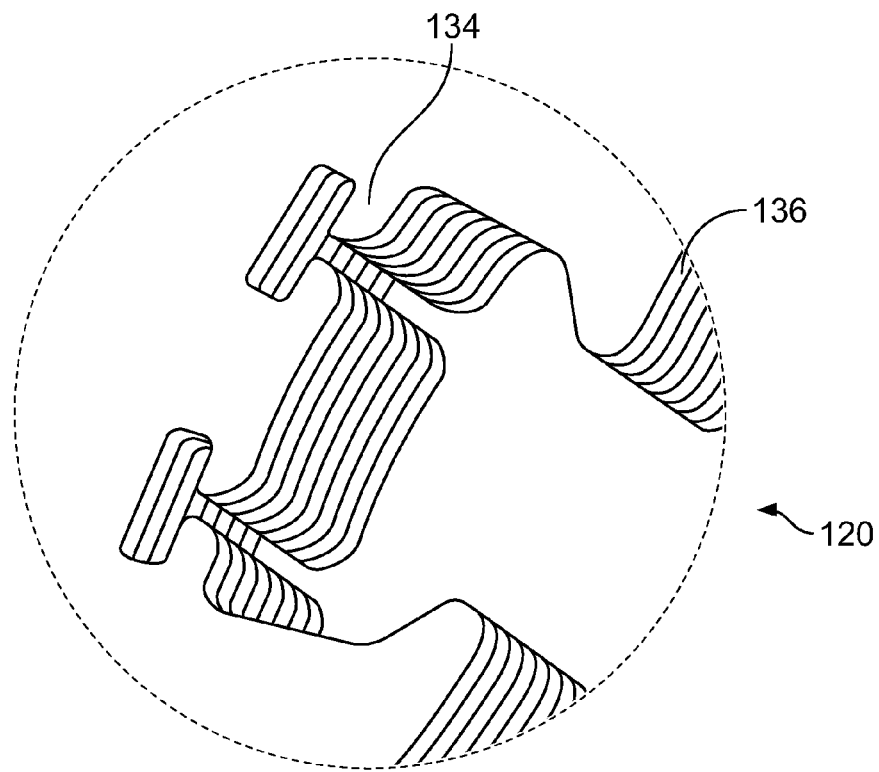
FIG. 28 is a detail from a magnet core according to a third embodiment.
Figure 29:
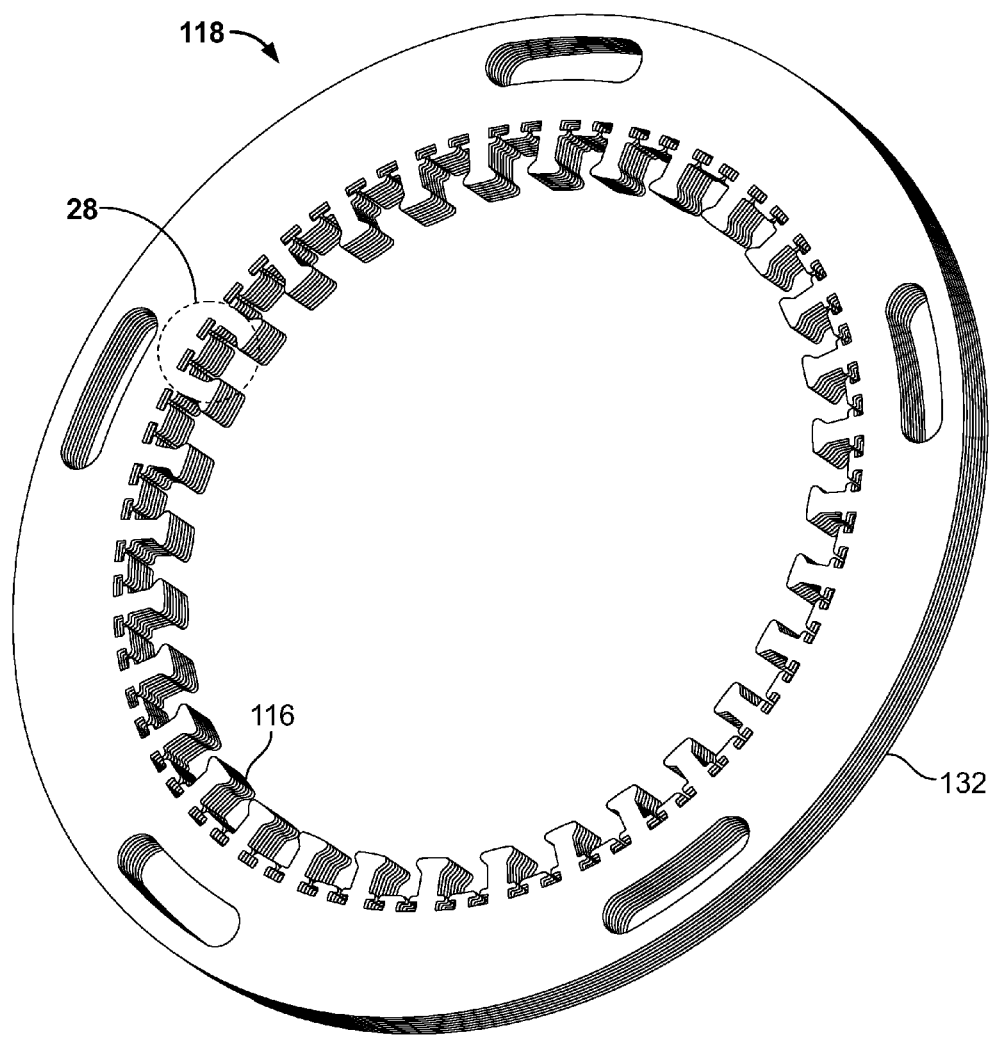
FIG. 29 is a perspective view of the magnet core according to the third embodiment.
Figure 30:
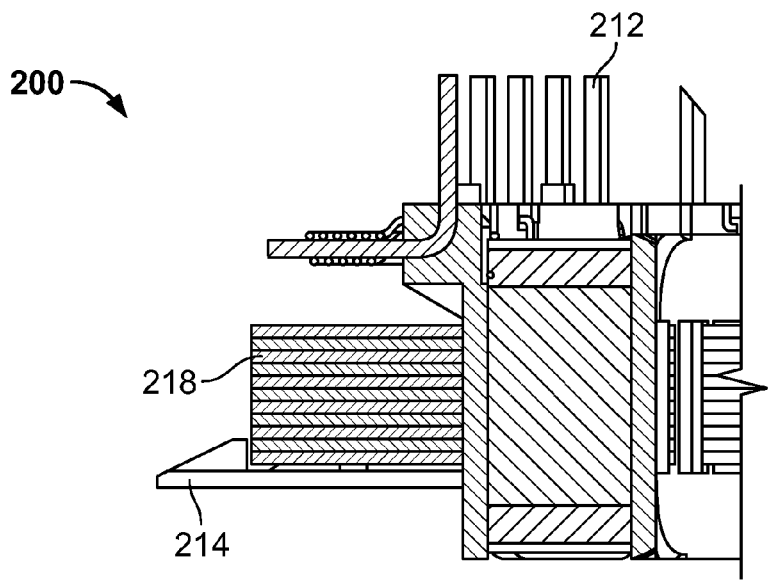
FIG. 30 is a section through a known coil form fixing by means of a catch hook.
Figure 31:
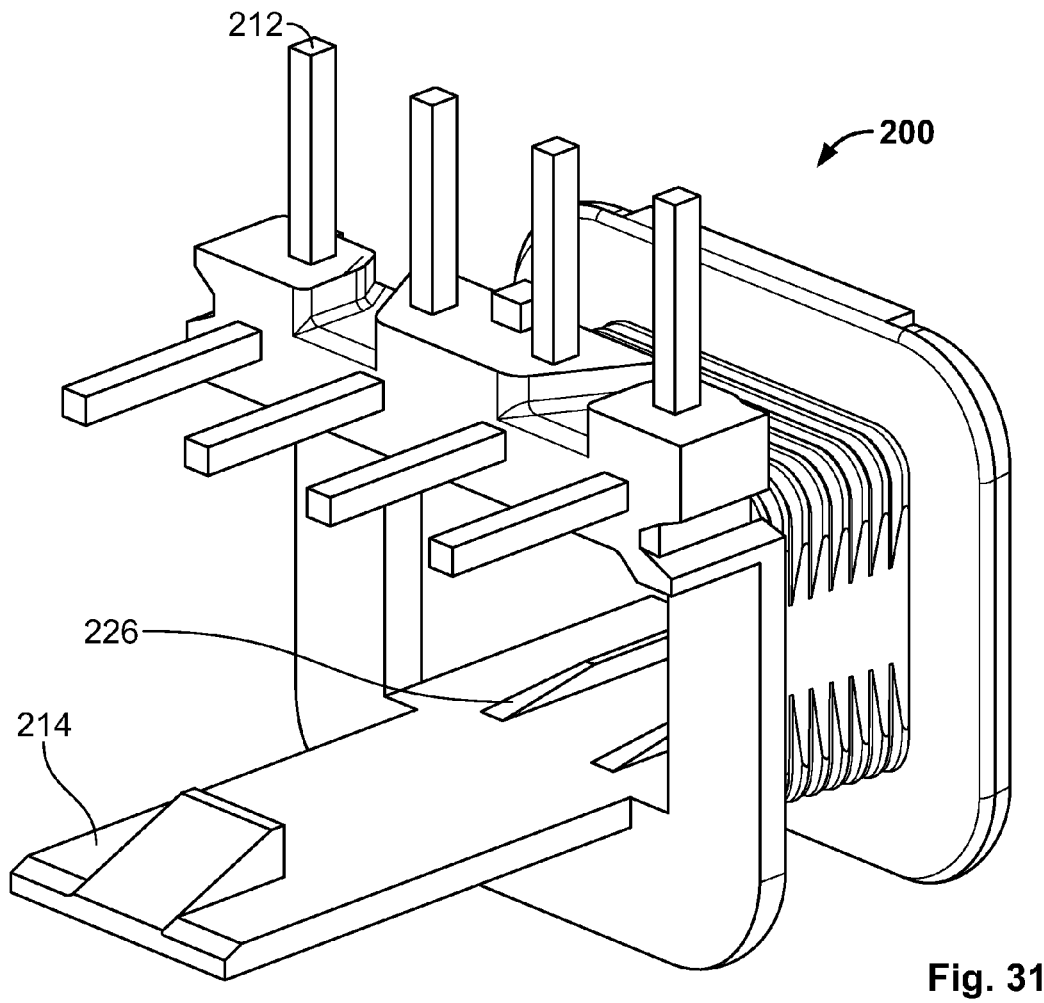
FIG. 31 is a perspective view of the known coil form.

Finally, a third embodiment is shown in FIGS. 28 and 29. By contrast with the magnet cores thus far, this magnet core is constructed from identical lamellae 136 laid congruently on top of one another. This extremely simple embodiment does have the disadvantage by comparison with the embodiments of FIG. 14 or 26 that the fine holding structures have to be manufactured with a correspondingly fine tool and with low tolerances. However, this solution also has the advantage that it is easier to construct the layering of the lamellae around the magnet core 118 and no complex means for achieving the angular offset are required.

In the following, the mounting of a reluctance resolver according to a first embodiment is to be explained in detail with reference to FIG. 1 to 25. For this purpose, in a first production step the coil form 100 according to the invention is prepared and provided with corresponding winding. The wires are guided via the feed means 108 to the winding-wire terminals 110, where they are fixed for example as wire-wrap. Alternatively, other types of contacting may also be used.

Further, a magnet core 118 is layered from punched metal sheets 136, every two metal sheets which lie on top of one another being layered on top of one another rotated through 90° relative to one another. This produces the holding projections 134, which are positioned opposite one another at a small distance d and which can cooperate as a three-dimensional holding structure 120 with the holding ribs 114 and the coil forms 100. In accordance with FIGS. 26 and 27, an offset angle of N*360°/t may generally be selected, N being a natural number and t representing the number of teeth. Alternatively, groups of lamellae may also be layered so as to be offset.

In the following step, the coil forms 100 are slid onto the teeth 116. The bevelled crimped ribs 126 assist in centring the coil form 100 on the tooth 116. When the final position of the coil form 100 on the magnet core 118 is achieved, on the one hand the holding ribs 114 are slid so far between the holding projections 134 that the coil form is rigidly fixed, and on the other hand, the inner wall of the recess 124 of the coil form 100 is in engagement with the pole shoe of the tooth 116. This also makes it impossible for the coil to twist in relation to the tooth during operation.

In a following production step, a circuit board 148 which makes the necessary wiring between the individual coil windings possible is slid over the contact pins 112, and a soldering step closes the electrical connection. Naturally, press-in contacts or other electrical connection methods may alternatively be provided.

In conclusion, the arrangement according to the invention has the following advantages, both when used in reluctance resolvers and when used in electrical motors or generators.

The coil forms may be fastened to a magnet core particularly securely. This provides substantially better resistance to environmental influences such as vibration and sudden changes in temperature. Further, the coil form is considerably better centred on the stator assembly, in such a way that the electrical properties of the electrical machine are improved, since all of the coils assume the same position.

Further, with the mounting according to the invention, plastics material chips can be prevented from contaminating the arrangement. Nevertheless, there is no unnecessary increase in the manufacturing cost of the stator assembly, since the layering according to the invention means that wider structures are sufficient to produce the narrow holding projections required.

Finally, the configuration of the stator with integrated pole shoes makes higher accuracy possible in resolver applications and makes higher efficiency possible in motors and generators.

The invention claimed is:

1. Coil form for mounting on a magnet core, wherein the coil form comprises:

a winding form for applying a winding, the winding form comprising a recess for receiving a tooth of the magnet core, at least one holding rib being integrally formed on the coil form and fixing the coil form to the tooth in cooperation with a holding structure of the magnet core, wherein the at least one holding rib faces towards a yoke back of the magnet core when mounted, and the at least one holding rib is formed for engaging with the holding structure in an interference fit.

2. Coil form according to claim 1, wherein at least one holding rib is dimensioned in such a way that the coil form is fixed to the tooth in an interference fit.

3. Coil form according to claim 1, wherein at least one holding rib is formed in such a way that the coil form is fixed to the tooth by locking.

4. Coil form according to claim 1, further comprising a first and a second flange, wherein the first flange supports the at least one holding rib and faces towards a yoke back of the magnet core when mounted.

5. Coil form according to claim 1, wherein at least one crimped rib is integrally formed on a wall of the recess and comes into engagement with the tooth of the magnet core in such a way that the crimped rib is deformed and an interference fit is provided between the tooth and the coil form.

6. Coil form according to claim 1, wherein the at least one crimped rib is arranged in such a way that it comes into engagement with an outer surface of the tooth, this surface extending in a direction in which lamellae of which the magnet core is composed are layered.

7. Coil form according to claim 1, wherein the cross-section of the recess has a taper which leads to an interference fit with an end face region of the tooth.

8. Magnet core which is formed by a number of lamellae manufactured from sheet metal, which are layered on one another in a plane-parallel manner and interconnected, wherein the magnet core comprises a holding structure for fixing a coil form according to claim 1.

9. Magnet core according to claim 8, wherein every two lamellae lying on top of one another are rotated through an offset angle relative to one another to form the holding structure.

10. Magnet core according to claim 9, wherein the offset angle is N*360°/t, N being a natural number and t being the number of teeth.

11. Magnet core according to claim 8, which is formed as an annular core comprising a yoke back and a plurality of teeth which are arranged on the inner peripheral side and are separated from one another by grooves.

12. Magnet core according to claim 11, wherein the holding structure comprises mutually opposed hook-shaped projections which cooperate with the at least one holding rib.

13. Magnet core according to claim 11, wherein the teeth comprise an end face region which is widened opposite a connection region to the yoke back.

14. Magneto-electric angle sensor, comprising a stator, ferromagnetic at least in part, and a rotor, ferromagnetic at least in part, which are positioned opposite one another so as to form an annular gap, the magnetic resistance in the gap varying periodically, based on a shape of the rotor which varies over the circumference, when the rotor rotates about an axis of rotation, comprising a magnetic flux transmitter which is arranged on the stator and generates a predetermined magnetic flux distribution in the gap using at least one pole pair, comprising a magnetic flux receiver which is arranged on the stator and measures the intensity of the magnetic field using at least two mutually angularly offset signal pole pairs, it being possible to deduce from the two receiver signals an angle value for a relative position of the rotor relative to the stator, wherein the stator is formed by a magnet core and the magnetic flux transmitter or the magnetic flux receiver comprises windings which are arranged on coil forms according to claim 1.

15. Magneto-electric angle sensor, comprising a stator, ferromagnetic at least in part, and a rotor, ferromagnetic at least in part, comprising a magnetic flux transmitter which is arranged on the rotor and generates a predetermined magnetic flux distribution in the gap using at least one pole pair, comprising a magnetic flux receiver which is arranged on the stator and measures the intensity of the magnetic field using at least two mutually angularly offset signal pole pairs, it being possible to deduce from the two receiver signals an angle value for a relative position of the rotor relative to the stator, wherein the stator is formed by a magnet core and the magnetic flux receiver comprises windings which are arranged on coil forms of claim 1, or wherein the rotor is formed by a magnet core and the magnetic flux transmitter comprises windings which are arranged on coil forms according to claim 1.

16. Method for manufacturing a magneto-electronic angle sensor, comprising the steps of:
    producing a magnet core, which comprises distributed over the circumference a plurality of teeth, which are separated from one another by grooves;
    producing a plurality of coil forms which are provided with windings; mounting the coil forms on the teeth of the magnet core by sliding them on radially, wherein at least one holding rib being integrally formed on each coil form, and when slid on cooperates with a holding structure of the tooth in such a way that the coil form is fixed to the tooth, wherein the at least one holding rib faces towards a yoke back of the magnet core when mounted, and the at least one holding rib is formed for engaging with the holding structure in an interference fit.

17. Method according to claim 16, wherein the step of providing the magnet core comprises:
    punching out a plurality of lamellae from sheet metal;
    layering the lamellae in a plane-parallel manner to form the magnet core, every two lamellae which lie on top of one another being rotated through an offset angle relative to one another to form the holding structure for fixing a coil form.

18. Method according to claim 16, wherein when the coil form is mounted at least one crimped rib, which is arranged on the coil form, comes into engagement with a surface of the tooth, this surface extending in a direction in which the lamellae of which the magnet core is composed are layered, and wherein the deformation of the crimped rib results in an interference fit of the coil form on the tooth.

19. Method according to claim 16, wherein when the coil form is mounted each end face region of the tooth cooperates with a tapered cross-sectional region of a recess of the coil form in such a way that the coil form is held on the end face region of the tooth by an interference fit.

20. Coil form for mounting on a magnet core, wherein the coil form comprises:
    a winding form for applying a winding, the winding form comprising a recess for receiving a tooth of the magnet core, at least one holding rib being integrally formed on the coil form and fixing the coil form to the tooth in cooperation with a holding structure of the magnet core; and
    a first and a second flange, wherein the first flange supports the at least one holding rib and faces towards a yoke back of the magnet core when mounted.

21. Coil form according to claim 20, wherein at least one holding rib is dimensioned in such a way that the coil form is fixed to the tooth in an interference fit.

22. Coil form according to claim 20, wherein at least one holding rib is formed in such a way that the coil form is fixed to the tooth by locking.

* * * * *